(12) United States Patent
Mesaki et al.

(10) Patent No.: US 6,436,537 B1
(45) Date of Patent: Aug. 20, 2002

(54) INSULATED WIRE

(75) Inventors: Masakazu Mesaki; Yoshinori Tatematsu; Masaki Sugiura, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/402,897

(22) PCT Filed: Feb. 12, 1999

(86) PCT No.: PCT/JP99/00618
§ 371 (c)(1),
(2), (4) Date: Oct. 13, 1999

(87) PCT Pub. No.: WO99/41757
PCT Pub. Date: Aug. 19, 1999

(30) Foreign Application Priority Data

Feb. 13, 1998 (JP) .......................................... 10/031802

(51) Int. Cl.$^7$ .............................. B32B 15/00; H01B 7/00
(52) U.S. Cl. ................. 428/379; 428/383; 174/110 SR; 174/110 N
(58) Field of Search ................................ 428/379, 383; 174/110 SR, 110 N (56) References Cited

U.S. PATENT DOCUMENTS 4,348,460 A * 9/1982 Saunders et al. ............ 428/383
4,350,738 A * 9/1982 Saunders et al. ............ 428/383

(List continued on next page.)

FOREIGN PATENT DOCUMENTS

| JP | A5010589 | 8/1975 |
|----|----------|--------|
| JP | A5580208 | 6/1980 |

(List continued on next page.)

OTHER PUBLICATIONS

Shioya et al., Proc. Electr. Electron. Insul. Conf., vol. 18, pp. 231–233 (1987).

Primary Examiner—N. Edwards
Assistant Examiner—J. M. Gray
(74) Attorney, Agent, or Firm—Birch, Stewart, Kolasch & Birch, LLP (57) ABSTRACT

There is disclosed an insulated wire, which comprises at least one insulating layer formed by applying and baking, directly or via another insulating layer on a conductor, a resin composition containing at least one selected from the group consisting of a polyamidimide resin and a polyimide resin, each having, in the molecular structure of the resin, a structure represented by formula (I), and/or a resin composition containing at least one selected from the group consisting of a polyamidimide resin and a polyimide resin, each having, in the molecular structure of the resin, a structure represented by formula (II), and said insulated wire has 0.2% yield stress of not more than 110 Mpa. This insulated wire, even if its insulation coating is made thinner, is excellent in resistance to scratches, and it is able to prevent the coating from breakage at the time of coil working, especially of the insertion of a coil into a stator slot, under rigorous conditions.

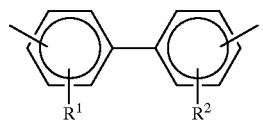

(I)

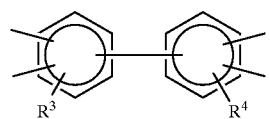

(II)

In the formulae, $R^1$, $R^2$, $R^3$, and $R^4$, each are a hydrogen atom, an alkyl group, a hydroxyl group, a halogen atom, or an alkoxy group.

7 Claims, 1 Drawing Sheet

| | U.S. PATENT DOCUMENTS | |
|---|---|---|
| JP | A55104461 | 8/1980 |
| JP | A5615511 | 2/1981 |
| JP | A56143266 | 11/1981 |
| JP | A5842672 | 3/1983 |
| JP | A58186107 | 10/1983 |
| JP | A61269808 | 11/1986 |
| JP | A6200605 | 9/1987 |
| JP | A6329412 | 2/1988 |
| JP | A63119109 | 5/1988 |
| JP | A4103110 | 4/1992 |
| JP | A5225830 | 9/1993 |
| JP | A5230419 | 9/1993 |
| JP | A636617 | 2/1994 |

| JP | A6196025 | 7/1994 |
|---|---|---|
| JP | A721849 | 1/1995 |

FOREIGN PATENT DOCUMENTS

| 4,378,407 | A | * | 3/1983 | Yamamoto et al. | 428/383 |
|---|---|---|---|---|---|
| 4,379,807 | A | * | 4/1983 | Otis et al. | 428/383 |
| 4,385,435 | A | * | 5/1983 | Saunders et al. | 29/596 |
| 4,385,437 | A | * | 5/1983 | Saunders et al. | 29/596 |
| 4,390,590 | A | * | 6/1983 | Saunders et al. | 428/383 |
| 4,406,055 | A | * | 9/1983 | Saunders et al. | 29/596 |
| 4,693,936 | A | * | 9/1987 | McGregor et al. | 428/383 |
| 5,356,708 | A | * | 10/1994 | Matsuura et al. | 428/375 |
| 5,393,612 | A | * | 2/1995 | Matsuura et al. | 428/458 |
| 5,965,263 | A | * | 10/1999 | Tatematsu et al. | 428/383 |

* cited by examiner

INSULATED WIRE

This application is the national phase under 35 U.S.C. §371 of PCT International Application No. PCT/JP99/00618 which has an International filing date of Feb. 12, 1999, which designated the U.S. of America.

TECHNICAL FIELD

The present invention relates to an insulated wire suitable for use in a motor, particularly in a stator of a stator motor or a generator requiring a rigorous winding process.

BACKGROUND ART

For a generator (e.g. an alternator) or a motor for an automobile, or a compressor motor for a refrigerator, or the like, miniaturization and high-density configuration have progressed, while the needs for high performance and high power have grown in recent years. To meet these needs, it is necessary to insert additional, or larger-sized, conductors (i.e. electric wires) into a slot of an iron core of the insulated wire used in the stator side of these generators or motors. That is, to achieve this purpose, a more increased space factor (a ratio of the volume of an electric wire to the slot space) than ever before is strongly required. As a result, the insulated wire has generally been processed or worked on so rigorously or strongly that the shape of its cross section has become greatly altered, making it vulnerable to external breakage or damage, and thus decreasing conspicuously the reliability of the insulated wire itself. Accordingly, the development of an insulated wire whose insulation coating will not be broken even by external processing being so rigorous or strong that the conductor is deformed, and that has high resistance to external scratches, has long been desired.

On the other hand, many insulated wires coated with an electrically insulated material have been widely used as material for coils to be built in a variety of electrical machinery and apparatus. Recently, the process of coil winding using the insulated wire has been speeded up and rationalized and also switched from conventional hand-winding to automatic-winding using a coil winding machine. Further, the process of insertion of coils into a stator slot has been automated as well.

However, the automatic coil-winding process causes great stress on the coating of the insulated wire, due to high tension applied to the insulated wire, thereby inevitably making such insulated wires vulnerable to scratches or breakage. Moreover, the insulated wire has received more pressure by the insertion of coils into the stator slot due to the use of the machine, unlike in the case of conventional manual insertion. Under such circumstances, friction or rubbing is apt to occur frequently between wires, or between a wire and a substance contacted with the wire, readily causing insulation failure in coils.

Further, since miniaturization of the whole device and cost reduction can be realized by making the space factor of an insulated wire in a stator slot of a coil as large as possible, it is necessary to accordingly make the outer diameter of the wire smaller. In recent years, in the above-mentioned trend of making the diameter smaller, in order to increase the power of the device, efforts have been made to keep or increase the present diameter of a conductor, as well as to make the insulating coat thinner.

However, when a wire that has a smaller thickness of the insulating coat is utilized in the automatic coil-winding or the automatic insertion of a coil, in which the wire is used, into a stator slot, it results in an increased frequency of breakage of the coating, and an increased rate of occurrence of insulation failure of the coil.

To solve the problems described above, various methods have been proposed, including (1) reducing the coefficient of friction on the surface of an insulated wire, thereby reducing or preventing breakage caused by contact between insulated wires or between an insulated wire and another object, to suppress the occurrence of external scratches; (2) improving adhesion between an insulation coating and a conductor, thereby preventing the conductor from peeling off the insulation coating, and (3) improving the mechanical strength of the insulation coating, thereby increasing resistance of the insulation coating to breakage. The smaller the coefficient of friction, the easier the coil winding work. Also, the higher the mechanical strength of the coat, the lower the frequency of occurrence of breakage caused by the coil winding or the insertion of coils into a stator slot (hereinafter referred to as coil working, as a whole).

As the above conventional means, first, the methods (1) for reducing the coefficient of friction on the surface of an insulated wire are proposed to comprise the step of: applying, onto the insulated wire surface, a wax, an oil, a surfactant, a solid lubricant, and the like, as disclosed, for example, in JP-A-55-80208 ("JP-A" means unexamined Japanese patent application), JP-A-56-15511, JP-A-58-186107, and JP-A-61-269808; or using a coated/baked anti-friction material composed of a wax emulsifiable in water and a resin emulsifiable in water and to be set by heat, as disclosed, for example, in JP-A-62-200605; or carrying out lubrication by adding polyethylene fine powder or fluororesin fine powder to an insulation varnish itself, as disclosed, for example, in JP-A-63-119109 and JP-A-63-29412. The aim of the above methods is to protect an insulating layer from external scratches by surface slippage of an insulated wire, which protection results from the improved surface lubricity of the insulated wire.

Next, the method (2) described above for improving adhesion between an insulation coating and a conductor, by mixing an additive, adapted to improve the adhesion with a conductor, into a resin vanish, in order to improve work-resistance and abrasion-resistance of the insulated wire, thereby improving the resistance to external scratches, has been proposed, for example, in JP-A-56-143266 and JP-A-58-42672.

Further, the method (3) described above for improving the mechanical strength of the coat itself has been disclosed, for example, in JP-A-5-225830 and JP-A-6-196025, wherein, by taking the above (1) and (2) into consideration, the description that an insulation varnish, obtained by polycondensation of bitolylen diisocyanate and trimellitic anhydride, can improve the mechanical strength of the coating, has been provided. This method proposes, from the viewpoint of molecular structure of a resin, introducing many rigid structures into the molecule of a resin, thereby increasing the coating's mechanical strength and reducing working scratches on the coating of the insulated wire. The unidirectional abrasion test (the test stipulated in JIS C 3003; a scratching test in which an electric wire is applied an increasing load, to scratch a coating thereof with a piano wire) of these insulated wires, which is recently considered to be an important coating breakage test, has revealed high quality as an insulated wire, and the insulated wire, even though it is made thinner, can prevent the coating from breakage at the time of coil working. However, because the level of softness of such insulated wires after being expanded, or after being subjected to a heat history, is lower than that of the conventional insulated wire, and because, especially when rigorous bending is applied, the insulated wires do not present sufficient softness, there is a risk that cracks or fractures may occur on the coating thereof.

Furthermore, even by using the above method (1) or (2), singly or in combination with each other, the current requirement for resistance to external scratches has not been satisfied. The insulated wires obtained even by using the above methods (1), (2), and (3) cannot provide sufficient external-scratch resistance required for overcoming various difficulties associated with winding work and insertion working of coils, and further improvement has long been desired.

In the insulated wire using an insulation coating with high mechanical strength obtained by employing the above method (3), a hard conductor having 0.2% yield stress ($\sigma_{0.2}$) of as high as about 120 to 140 MPa, has conventionally been used. Although less breakage at the time of coil-winding process may occur in such insulated wires composed of a coating of high mechanical strength and a conductor of high hardness, since sometimes the insulation coating suffers from breakage at the time of the insertion of coils into a stator slot, further improvement has been strongly required.

Accordingly, it is an object of the present invention to provide an insulated wire that, even if its insulation coating is made thinner, is excellent in resistance to scratches or damage, and that is able to prevent the coating from such breakage at the time of coil working, especially at the time of the insertion of a coil using the wire into a stator slot, under rigorous conditions.

Other and further objects, features, and advantages of the invention will appear more fully from the following description.

DISCLOSURE OF INVENTION

The inventors of the present invention conducted careful study to solve the problems in conventional insulated wires described above. As a result, we have found that the cause for insufficient resistance to external scratches still achieved by the above method (3) is that there is a limit to the resistance to external scratches achieved only by improving the mechanical strength of the insulation coating. Moreover, we have also found that, not only the mechanical strength of the insulation coating but also the appropriate softness of a conductor, is important for improving the resistance to external scratches in the insulated wires, and that such resistance to external scratches can be dramatically improved by introducing a rigid structure into the molecular structure of a resin constituting the insulation coating, to obtain a coating of high mechanical strength (and of high toughness), as well as by using a conductor having a predetermined softness, and, through resulting synergistic effects thereof, by weakening a force or shock that may cause such external scratches on the insulated wire. The present invention has been completed based on these findings.

That is, according to the present invention, there is provided:

(1) An insulated wire, which comprises at least one insulating layer formed by applying and baking, directly or via another insulating layer on a conductor, a resin composition containing at least one selected from the group consisting of a polyamidimide resin and a polyimide resin, each having, in the molecular structure of the resin, a structure represented by the following formula (I):

(I)

wherein $R^1$ represents one selected from among a hydrogen atom, an alkyl group, a hydroxyl group, a halogen atom, and an alkoxy group; $R^2$ represents one selected from among a hydrogen atom, an alkyl group, a hydroxyl group, a halogen atom, and an alkoxy group, and/or a resin composition containing at least one selected from the group consisting of a polyamidimide resin and a polyimide resin, each having, in the molecular structure of the resin, a structure represented by the following formula (II):

(II)

wherein $R^3$ represents one selected from among a hydrogen atom, an alkyl group, a hydroxyl group, a halogen atom, and an alkoxy group; $R^4$ represents one selected from among a hydrogen atom, an alkyl group, a hydroxyl group, a halogen atom, and an alkoxy group, and said insulated wire has 0.2% yield stress of not more than 110 Mpa;

(2) The insulated wire as stated in the above item (1), wherein 0.2% yield stress of the insulated wire is 105 MPa to 93 MPa;

(3) The insulated wire as stated in the above item (1) or (2), wherein part or all of the insulating layers contains a repeating unit derived from a monomer component having the structure represented by the above formula (I), and/or a repeating unit derived from a monomer component having the structure represented by the above formula (II), in an amount of 20 mol % to 60 mol % in all repeating units;

(4) The insulated wire as stated in the above item (1) or (2), wherein part or all of the insulating layers contains a repeating unit derived from a monomer component having the structure represented by the above formula (I), and/or a repeating unit derived from a monomer component having the structure represented by the above formula (II), in an amount of 40 mol % to 55 mol % in all repeating units;

(5) The insulated wire as stated in the above item (1), (2), (3), or (4), wherein the surface of the outermost layer of the insulating layers has lubricity with a coefficient of static friction of not more than 0.1;

(6) The insulated wire as stated in the above item (5), wherein the surface of the outermost layer of the insulating layers has a lubricating layer, the lubricating layer being formed by applying and baking a lubricating paint that contains a wax and a thermosetting resin, and that further contains a rosin-series resin and/or a maleic-series resin in an amount of 3 to 20 parts by weight, to 100 parts by weight, of the total solid content of the wax and the thermosetting resin; and (7) The insulated wire as stated in the above item (1), (2), (3), (4), (5), or (6), which is utilized in a stator of a generator or a motor.

BEST MODE FOR CARRYING OUT THE INVENTION

The present invention is described in details below.

The insulated wire of the present invention has an insulating layer formed directly or via another insulating layer(s) on a conductor, and at least one layer of the insulating layers contains a polyamidimide resin or a polyimide resin having a chemical structure represented by the formula (I), and/or a chemical structure represented by the formula (II), in its molecule.

In the formula (I), $R^1$ and $R^2$ may be the same or different from and each represent a hydrogen atom, an alkyl group (preferably an alkyl group having 1 to 5 carbon atoms, such as methyl, ethyl and butyl), a hydroxyl group, a halogen atom (e.g., chlorine atom, bromine atom and fluorine atom), or an alkoxy group (preferably an alkoxy group having 1 to 5 carbon atoms, such as methyloxy, ethyloxy, butyloxy).

In the formula (II), $R^3$ and $R^4$ may be the same or different from and each represent a hydrogen atom, an alkyl group, a hydroxyl group, a halogen atom, or an alkoxy group, and specific examples or preferable ranges of $R^3$ and $R^4$ have the same meanings as described for $R^1$ and $R^2$ in formula (I).

The polyamidimide resin and the polyimide resin that are used for the formation of the insulating layer in the present invention, can be prepared by using synthetic raw materials obtained by mixing, as a raw material, dicarboxylic acids, tricarboxylic acids, tetracarboxylic acids, or acid anhydrides or acid dianhydrides thereof, diisocyanates, or diamines, in which at least one of the above has a structure of the formula (I) and/or the formula (II) in the molecule, with other dicarboxylic acids, tricarboxylic acids, tetracarboxylic acids, or acid anhydrides or acid dianhydrides thereof, diisocyanates, or diamines.

Specific examples of the dicarboxylic acid having the structure represented by the formula (I) include, for example, 4,4'-biphenyldicarboxylic acid, 3,3'-biphenyldicarboxylic acid, 3,3'-dimethyl-4,4'-biphenyldicarboxylic acid, 3,3'-diethyl-4,4'-biphenyldicarboxylic acid, 3,3'-dihydroxy-4,4'-biphenyldicarboxylic acid, 3,3'-dichloro-4,4'-biphenyldicarboxylic acid, 3,3'-dimethyloxy-4,4'-biphenyldicarboxylic acid, 3,3'-diethyloxy-4,4'-biphenyldicarboxylic acid, 4,4'-dimethyl-3,3'-biphenyldicarboxylic acid, 4,4'-diethyl-3,3'-biphenyldicarboxylic acid, 4,4'-dihydroxy-3,3'-biphenyldicarboxylic acid, 4,4'-dichloro-3,3'-biphenyldicarboxylic acid, 4,4'-dimethyloxy-3,3'-biphenyldicarboxylic acid, 4,4'-diethyloxy-3,3'-biphenyldicarboxylic acid, 2,2'-dimethyl-4,4'-biphenyldicarboxylic acid, 2,2'-diethyl-4,4'-biphenyldicarboxylic acid, 2,2'-dihyroxy-4,4'-biphenyldicarboxylic acid, 2,2'-dichloro-4,4'-biphenyldicarboxylic acid, 2,2'-dimethyloxy-4,4'-biphenyldicarboxylic acid, 2,2'-diethyloxy-4,4'-biphenyldicarboxylic acid. These are used singly or with two or more members mixed. Among them, 4,4'-biphenyldicarboxylic acid and 3,3'-dimethyl-4,4'-biphenyldicarboxylic acid are preferable, and 4,4'-biphenyldicarboxylic acid is particularly preferable.

Further, specific examples of the tetracarboxylic acid and tetracarboxylic dianhydride having the structure represented by the formula (II) include, for example, 3,3',4,4'-biphenyltetracarboxylic acid and an acid dianhydride thereof, and a compound having the molecular structure of 3,3',4,4'-biphenyltetracarboxylic acid or an acid dianhydride thereof that is substituted by a functional group, such as —OH, —$CH_3$, —Cl, or the like. These are used singly or with two or more members mixed. Among them, 3,3',4,4'-biphenyltetracarboxylic dianhydride and 2,2'-dimethyl-3,3',4,4'-biphenyltetracarboxylic dianhydride are preferable, and 3,3',4,4'-biphenyltetracarboxylic dianhydride is particularly preferable.

Specific examples of the diisocyanate having the structure represented by the formula (I) include, for example, biphenly-4,4'-diisocyanate, biphenyl-3,3'-diisocyanate, biphenyl-3,4'-diisocyanate, 3,3'-dichlorobiphenyl-4,4'-diisocyanate, 2,2'-dichlorobiphenyl-4,4'-diisocyanate, 3,3'-dibromobiphenyl-4,4'-diisocyanate, 2,2'-dibromobiphenyl-4,4'-diisocyanate, 3,3'-dimethylbiphenyl-4,4'-diisocyanate (4,4'-bitolylenediisocyanate (TODI)), 2,2'-dimethylbiphenyl-4,4'-diisocyanate, 2,3'-dimethylbiphenyl-4,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, 2,3'-dimethoxybiphenyl-4,4'-diisocyanate, 3,3'-diethoxybiphenyl-4,4'-diisocyanate, 2,2'-diethoxybiphenyl-4,4'-diisocyanate, 2,3'-diethoxybiphenyl-4,4'-diisocyanate. These are used singly or with two or more members mixed. Among them, 3,3'-dimethylbiphenyl-4,4'-diisocyanate and 3,3'-diethoxybiphenyl-4,4'-diisocyanate are preferable, and 3,3'-dimethylbiphenyl-4,4'-diisocyanate is particularly preferable.

Specific examples of the diamine having the structure represented by the formula (I) include, for example, benzidine, 3,3'-dimethylbenzidine, 2,2'-dihydroxybenzidine. These are used singly or with two or more members mixed. Among them, 3,3'-dimethylbenzidine and 3,3'-dihydroxyethylbenzidine are preferable, and 3,3'-dimethylbenzidine is particularly preferable.

The polyamidimide resin used for forming the insulating layer in the present invention can be obtained in a usual manner; for example, wherein a single tricarboxylic anhydride, or a mixture of a tricarboxylic anhydride, with part of the tricarboxylic anhydride being replaced with a dicarboxylic acid and/or a tetracarboxylic dianhydride, or a mixture of a dicarboxylic acid and a tetracarboxylic dianhydride, is reacted directly, in a polar solvent, with a diisocyanate; or alternatively wherein an oligomer with imide-bonds introduced, which is obtained by reacting 2 mol of a tetracarboxylic dianhydride with 1 mol of a diamine, is reacted, in a polar solvent, with an oligomer with amide-bonds introduced, which is obtained by reacting 1 mol of a dicarboxylic acid with 2 mol of a diisocyanate.

At least one of acid components, diisocyanates, and diamines, any of which have the structure represented by the above formula (I) and/or (II), is used, as a synthetic raw material, for the preparation of the above polyamidimide resin. In addition, other synthetic raw materials, including, for examples, acid components, such as trimellitic acid, isophthalic acid, terephthalic acid, trimellitic anhydride, pyromellitic dianhydride, 3,3',4,4'-benzophenonetetracarboxylic dianhydride, and derivatives thereof; aromatic diisocyanates, such as 4,4'-diphenylmethane diisocyanate (MDI) and tolylene diisocyanate (TDI); and aromatic diamines, such as m-phenylenediamine, 4,4'-diaminodiphenyl ether, 4,4'-diaminodiphenylmethane, 4,4'-diaminodiphenylsulfone, 4,4'-diaminobenzophenone, can be used in combination as well.

As a solvent used at the time of synthesis, any solvent can be used if a resin obtained after preparation can be dissolved therein; and, for example, N,N'-dimethylformamide, N,N'-dimethylacetamide, and the like may be used. Preferably, N-methyl-2-pyrrolidone can be used.

Specific examples of the method for synthesizing the polyamidimide resin to be used in the present invention include a method to obtain a polyamidimide-resin enamel (a resin composition) by reacting, in a polar solvent, such as N-methyl-2-pyrolidone, a mixture of 4,4'-biphenyldicarboxylic acid and trimellitic anhydride, employed as the acid components, with 4,4'-diphenylmethanediisocyanate, employed as the diisocyanate component, which method is the simplest. In this example, the polyamidimide-resin enamel can be similarly produced even if 3,3',4,4'-biphenyltetracarboxylic diandyride is used instead of the above 4,4'-biphenyldicarboxylic acid to be used. In the former case of using 4,4'-biphenyldicarboxylic acid, the polyamidimide-resin enamel contains a higher proportion of an amide component than an imide component, and, in the latter case of using 3,3',4,4'-biphenyltetracarboxylic dianhydride, the resultant resin contains a higher proportion of an imide component than an amide component.

The thus-obtained polyamidimide-resin enamel is applied and baked, directly or via (some) another layer(s) on a conductor, thereby forming the insulating layer on the conductor.

The polyimide resin used for the insulating layer in the present invention can be obtained by a usual manner, wherein a polyamide acid resin solution is obtained by reacting a tetracarboxylic dianhydride with a diamine in a polar solvent, and the resultant solution is heated when made into an insulated wire, thereby dehydrating the resin, to cause imidization.

Other examples of the method include a direct imidization method achieved by reacting, in a polar solvent, a tetracarboxylic dianhydride with a diisocyanate. In this case, since the thus-obtained polyimide in the resultant resin solution is poorly soluble in the solvent, it is necessary to select a monomer component to be used that is easily dissolved in the solvent. For example, the obtainable polyimide is more easily dissolved in a solvent, when it is obtained by using, as a tetracarboxylic acid component, 3,3',4,4'-biphenylsulfonetetracarboxylic dianhydride, rather than using a pyromellitic dianhydride. Further, the obtained polyimide is more easily dissolved in a solvent if it is produced by using, as a diisocyanate component, 2,6'-tolylene diisocyanate, rather than using 4,4'-diphenylmethane diisocyanate.

In these cases, the tetracarboxylic dianhydride can be used singly or as a mixture containing two or more components. Similarly, the diamines or diisocyanates can be used singly or as a mixture containing two or more components.

In the present invention, an insulating layer containing both the polyamidimide resin and the polyimide resin may be formed by mixing, at the time of applying (coating) and baking, a polyamidimide resin composition and a polyimide resin composition separately prepared, thereby forming a single insulating layer; or alternatively the insulated layer may be formed by first preparing a single resin mixture containing both the polyamidimide resin and the polyimide resin, and then by applying and baking the resulting resin mixture.

Further, to each insulating layer can be added a variety of additives conventionally known for addition to an insulation coating, within the range that does not impair the object of the present invention, and examples of the additive include a lubricant, inorganic fine powder, a metal alkoxylate, and the like.

In the present invention, an insulating layer of high hardness is formed by using the polyamidimde resin and/or the polyimide resin, in which these resins are obtained by using, as a synthetic raw material, at least one of acid components, diisocyanates, and diamines, any of which have the structure represented by the formula (I) and/or (II). Further, in the present invention, in the polyamidimide resin or the polyimide resin, a repeating unit derived from a monomer component having the structure represented by the formula (I) or (II) is preferably in an amount of the range of 20 to 60 mol %, and more preferably 40 to 55 mol %, among the total amounts of all of acid components, diisocyanates, and diamines that constitute these resins.

In the present invention, the reason for employing the insulating layer that contains the resin having the molecular structure represented by the formula (I) and/or (II), as the insulation coating on a conductor, is that tensile strength of the insulating layer can be improved by using a substance with a given chemical structure (a biphenyl structure) having benzene rings at positions adjacent to each other.

In the insulated wire of the present invention, there is no particular limitation to configurations of the insulating layer, and it is sufficient for the insulated wire to be provided with at least one insulating layer containing either of the specific polyamidimide resin or polyimide resin, or both of them. For example, the insulated wire of the present invention can be constructed so that its single insulating layer, or all layers of a plurality of insulating layers, may contain the polyamidimide resin and/or the polyimide resin described above. Alternatively, the insulated wire of the invention may have a constitution that is provided with both of an insulating layer containing the polyamidimide resin and/or the polyimide resin, and a layer containing none of these resins. In the latter case, for example, the insulated wire of the invention can be provided with a lower insulating layer that is formed by applying and baking, directly on the conductor, a polyester resin (an alcohol component: glycerol, etc.), a heat-resistant polyester resin (an alcohol component: trishydroxylethyl-isocyanurate, etc.), or a polyesterimide resin, and further provided with an upper insulating layer provided thereon, which is formed by applying and baking the polyimide resin and/or the polyamidimide resin described above.

In the insulated wire of the present invention, it is necessary that the resultant insulated wire has 0.2% yield stress of not more than 110 MPa. The reason is that, if the 0.2% yield stress exceeds 110 MPa, resistance to external scratches required for working under rigorous coil-winding processing conditions is reduced, to result in inferior resistance. In particular, the insulated wire has 0.2% yield stress of preferably 93 to 105 MPa. If 0.2% yield stress is less than 93 MPa, the insulated wire may be too flexible, in some cases, during coil-winding working, thereby causing a problem that elongation of the conductor of the insulated wire becomes too great (i.e., it becomes too slender).

In the present invention, the value of 0.2% yield stress is used as a scale of softness of the insulated wire, and this value can be obtained as described below. (Softness of an insulated wire): The value of stress is read at the time when the insulated wire is elongated by 0.2% on an S-S (load-stress) curve obtained by measurement, using a length of a marked line that is 250 mm and a tensile speed that is 20 mm/min, and this value of stress is defined as 0.2% yield stress. The unit of 0.2% yield stress is MPa. It means that the smaller this value, the better the softness of the insulated wire.

There is a possibility that such an insulated wire having high softness can be produced by applying and baking an insulation paint or varnish, at a low speed, under a low tension, in a paint-baking furnace, to a conductor obtained by being annealed in a batch manner in a vacuum annealing furnace, but this method is not appropriate for industrial application in terms of productivity. Accordingly, when the insulated wire of the present invention is prepared, it is preferable to carry out some means or contrivances including the process of annealing a conductor, whose processed rate before final annealing is 20 to 50%, in a longitudinal annealing furnace at a temperature of not less than 550° C., and the installation of a driving sheave disposed on a conductor conveying path in a baking furnace, to prevent the conductor from being hardened due to a load imposed during the paint-baking process, and the like, from the viewpoint of industrial manufacturing.

Further, in the insulated wire of the present invention, generally, use can be made of copper, or its alloy, as a material for the conductor. The softness of the insulated wire depends mainly upon the softness of the conductor. Therefore the value of 0.2% yield stress, as the softness of the conductor itself, is preferably not more than 110 MPa, more preferably in a range of 90 to 110 PMa, and particularly preferably in a range of 93 to 105 PMa.

Also, the tensile strength of the insulation coating in the present invention is preferably not less than 13 kg/mm$^2$. On the other hand, the tensile strength of a coating of the conventional insulated wire is not more than 10 kg/mm$^2$, and, in this case, if use is made to combine with such flexible conductor as used in the present invention, it may cause a conspicuous decrease in resistance to external scratches.

Further, in the present invention, the surface of the uppermost layer of the insulating layer preferably has lubricity with a coefficient of static friction of not more than 0.1. As the method of lubricating to impart the above lubricity to the insulating layer, publicly known various means can be utilized, including, for example, application of a wax, a surfactant, a solid lubricant, and the like to the surface of the insulated wire; utilizing a lubricating paint that is applied and baked; and addition of polyethylene fine powder, fluororesin fine powder, and the like to the insulating paint or varnish (resin composition) itself, for improvement of lubrication.

Among them, the method wherein a lubricating layer is formed by baking the lubricating paint to the surface of the insulated wire is preferable, because it can provide stable resistance to external scratches. The commercially available baking-type lubricating paint contains wax (natural wax, such as carnauba wax, beeswax, candelilla wax, rice wax, and the like; and synthetic wax, such as paraffin wax, polyethylene wax, montan wax, and the like) and a thermosetting resin (shellac resin, phenolic resin, and the like), as main ingredients. In order to improve the adhesion of an insulation varnish to the insulated wire, it is preferable to use a lubricating paint obtained by adding, to a known lubricating paint containing a wax and a thermosetting resin, further a rosin-series resin and/or a maleic-series resin, in an amount of about 3 to 20 parts by weight, to 100 parts by weight, of the total solid content of the wax and the thermosetting resin.

Examples of the rosin-series resin and/or the maleic-series resin include, for example, rosin, a rosin-denatured maleic resin, and a styrene/maleic resin, and among the above resins, a resin having an acid value of not less than 80 is preferable. By forming the lubricating layer with a lubricating paint with these resins mixed, the baking state in the lubricating layer can be well adjusted, and the adhesion of the insulation varnish to the surface of the resultant insulated wire is improved accordingly. The insulation varnish is a binder to bridge (fill) clearance between coil-wound insulated wires for integration of the wire. The good adhesion of the insulation varnish to the insulated wire (its lubricating layer) serves to strongly integrate the insulated wire wound into a coil.

The insulated wire of the present invention can be suitably used in a motor or a generator, and in particular a coil thereof. Among the above, the insulated wire of the present invention is especially useful for a stator application, where more, or larger-sized, conductors (wires) have to be inserted into a slot of an iron core.

In order to improve the resistance to external scratches and to make the insulating layer thinner, the whole thickness of the insulation coating of the insulated wire of the present invention is preferably 20 to 30 μm.

The insulated wire of the present invention is preferably suitable as an insulated wire for use in a generator or a motor, particularly in a stator, in which winding processing under rigorous conditions has been required in recent years, and it is of great value in terms of industrial application, since it has quite excellent resistance to external scratches or damage.

EXAMPLES

The present invention is described in more detail based on the following examples, but the invention is not to be limited to those.

The following Table 1 shows compositions (molar ratio) of components contained in each resin used for the insulating layer of the insulated wire in each Example and Comparative Example.

Preparation of Polyamidimide Resin-Series Enamel and Polyimide Resin-Series Enamel A mechanical-type rotary agitating apparatus and a heating device were fitted to a three necked flask of 3-liter volume, with a condensation tube attached, into which flask an inert gas could be introduced. Into this flask, N-methyl-2-pyrrolidone, as a solvent, and xylene, as a dehydration solvent, were poured, so that the ratio (by weight) of the former to the latter would be 8:2. While being agitated at room temperature, a polyvalent (polyhydric) carboxyl acid and a polyvalent isocyanate, as shown in Table 1, were added thereto, so that the total amount of each constituent of the polyvalent carboxylic acid would be equimolar with that of each constituent of the polyvalent isocyanate, and the solvent was adjusted so that the concentration of the whole solid content would be 25%. After the system was heated to a temperature of 140° C., reaction was carried out.

After the reaction was continued for about 4 hours, the reaction mixture was cooled to room temperature, to obtain the polyamidimde resin (AI-1 to AI-6)-series or polyimide resin (PI-1, PI-2)-series enamel.

TABLE 1

| Components in resin | Polyamidimide resin | | | | | | Polyimide resin | |
|---|---|---|---|---|---|---|---|---|
| | AI-1 | AI-2 | AI-3 | AI-4 | AI-5 | AI-6 | PI-1 | PI-2 |
| Polyvalent carboxyl acid | | | | | | | | |
| TMA | 1 | 1 | — | 1 | 1.5 | 1.6 | — | — |
| BDAc | 1 | — | 1 | — | — | — | — | — |
| BPDA | — | 1 | 1 | — | 0.5 | — | 1 | 1 |
| OPDA | — | — | — | 1 | — | — | 1 | — |
| PMDA | — | — | — | — | — | — | — | 1 |
| BTDA | — | — | — | — | — | 0.4 | — | — |
| Polyvalent isocyanate | | | | | | | | |
| MDI | 2 | 2 | — | 1 | — | — | — | — |
| TDI | — | — | 2 | — | 0.35 | 0.4 | 2 | 2 |
| TODI | — | — | — | 1 | 1.65 | 1.6 | — | — |
| Ratio (mol %) of structures of formula (I) or formula (II) in all monomers | 25 | 25 | 50 | 25 | 53.8 | 40 | 25 | 25 |

TMA: Trimellic anhydride
BDAc: 4,4'-biphenyldicarboxylic acid
BPDA: 3,3',4,4'-biphenyltetracarboxylic dianhydride
OPDA: 3,3',4,4'-oxydiphtalic dianhydride
PMDA: Pyromellic dianhydride
BTDA: 3,3',4,4'-benzophenonetetracarboxylic dianhydride
MDI: 4,4'-diphenylmethane diisocyanate
TDI: Tolylene diisocyanate (a mixture of 2,6-form and 2,4-form)
TODI: 4,4'-bitolylene diisocyanate Preparation of Insulted Wire and Evaluation Thereof The insulated wire was prepared and evaluated under the following conditions.

A copper wire, whose processed rate before final annealing was 25 to 45%, with a diameter of 1.0 mm, was used as a conductor for the insulated wire. Annealing was performed in a longitudinal hot-air circulating-type annealing furnace (at an annealing temperature of 500 to 620° C.), with or without a driving roll provided on a conveying path of the conductor. An insulation coating with a prescribed coating thickness was formed, by applying and baking the enamel several times, using a hot-air circulating-type baking furnace provided with a driving roll, with a furnace length of 7 m, at an ambient temperature of 500° C. A single insulating layer was formed, as the insulation coating, in Examples 1 to 7 and 11, and in Comparative Examples 1 to 3. On the other hand, two insulating layers, including an upper layer and a lower layer, were provided in Examples 8 to 10, and 12, and in Comparative Example 4. Meanwhile, the thickness of each of the upper and lower insulating layers is shown in parentheses as a ratio of their thicknesses, after the description of the coating thickness, in Table 2. The previously prepared polyamidimide resin enamel (AI-1 to AI-6) or polyimide resin enamel (PI-1 and PI-2) was used for the formation of the insulating layer. The enamel used for comparison did not contain the structure represented by formula (I) or (II): PYREML (trade name), manufactured by I.S.T. Co., Ltd., was used as the polyimide resin-series in which the pyromellitic dianhydride (PMDA) constituent was used as a raw material; and HI-406A (trade name), manufactured by Hitachi Chemical Co., Ltd., was used as the polyamidimide resin-series in which the trimellitic ahydride (TMA) constituent was used as a raw material; and further, LITON 3300 (trade name), manufactured by Totoku Toryo Co., Ltd., was used as a polyester. The thus-obtained insulated wire was subjected to surface treatment of applying paraffin wax, or coating and baking a baking-type lubricating paint, so that the coefficient of static friction on the wire surface would be note more than 0.1. As the baking-type lubricating paint, a lubricating paint that was prepared by adding 10 parts by weight of a rosin-denatured maleic resin (MALKYD 33, trade name, manufactured by Arakawa Chemical Industries Ltd., having an acid value of 300), to 100 parts by weight of the whole solid content of a commercially available lubricating paint TEC9601 (trade name, manufactured by Toshiba Chemicals, composed of camauba wax and a shellac resin), was used.

The properties of the thus-prepared respective insulated wires were evaluated in the manner described below.
(Softness of the Insulated Wire)

The value of stress was read at the time when the insulated wire was elongated by 0.2% on an S-S (load-stress) curve obtained by measurement using a length of a marked line of 250 mm and a tensile speed of 20 mm/min, and the value was defined as 0.2% yield stress. The unit of 0.2% yield stress is MPa. It is meant that the smaller this value, the better the softness of the insulated wire.
(Unidirectional Abrasion Test)

The test designated in Item 10 of JIS C3003 was carried out. The resulting value is represented by unit of N. It is meant that the higher the value, the less vulnerable the coating of the wire to be peeled off.
(Impact Drop Test)

Figure 1:
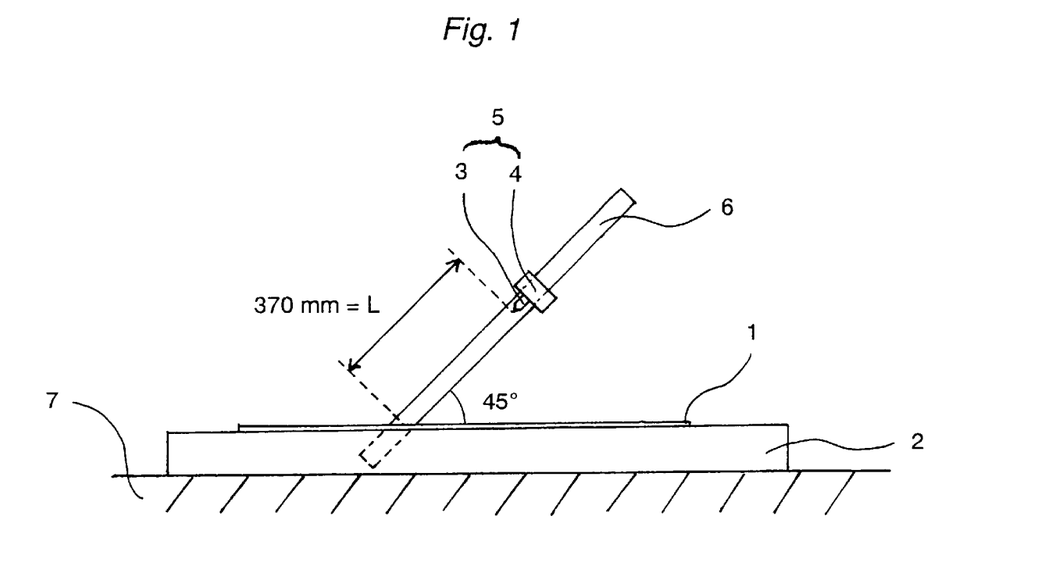
FIG. 1 shows a brief explanation view of an impact drop tester.
Figure 2:
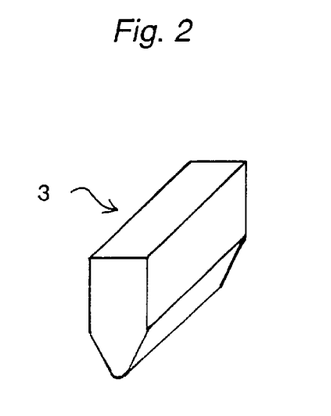
FIG. 2 shows a schematic diagram illustrating a cutting edge to be used for the tester shown in FIG. 1.

The test was carried out using an impact drop test apparatus, whose schematic diagram is shown in FIG. 1. The insulated wire 1 for test was fixed on a V-groove provided on the surface of a metal plate 2, in which the V-groove was shallower than a diameter of the insulated wire, and, from an angle of 45° to the longitudinal direction of the insulated wire, an impact load 5 (total load of a cutting edge 3 and a weight 4 being 100 g, 500 g, or 1000 g), in which the cutting edge 3, with a width of 12.5 mm, a tip angle of 55°, and a radius of curvature r at the tip of 0.5 mm, was fitted to the weight 4, was dropped, with a drop length L (an actual moving length of the load) of the load which length was 370 mm, and thereby an impact was applied to the insulated wire via the cutting edge. The load 5 was allowed to slide down, along a stanchion 6 fixed to the metal plate 2 put on a flat base 7. FIG. 2 is a schematic diagram of the cutting edge 3. The state of breakage of the insulation coating of the insulated wire caused by the drop shock, was evaluated by a leakage current test performed on the damaged or scratched part of the wire. The leakage current test was carried out with the polarity of the electrodes reversed, in accordance with a pin hole test designated in JIS C3003, and an ammeter was used for detection. The value of the leakage current was read from the ammeter, using the conductor as a positive electrode and water as a negative electrode and applying a voltage of 12V between the electrodes. The larger the value, the more vulnerable the wire is to receiving.

The resistance to external scratches was evaluated using results from both the impact dropping test and the unidirectional abrasion test.

Conditions, types of enamel or paint used, and measurement results in Examples 1 to 12 and Comparative Examples 1 to 4, are shown in Table 2.

TABLE 2

|  | Example 1 | Example 2 | Example 3 | Example 4 | Example 5 | Example 6 |
|---|---|---|---|---|---|---|
| Processed rate before final annealing (%) | 40 | 40 | 40 | 40 | 40 | 35 |
| Annealing temperature (° C.) | 620 | 620 | 620 | 620 | 620 | 620 |
| With or without driving roll | With | with | with | with | with | with |
| Softness of insulated wire (MPa) | 95 | 95 | 96 | 97 | 98 | 97 |
| Enamel | AI-1 | AI-2 | AI-3 | AI-4 | PI-1 | PI-2 |
| Surface treatment of insulated wire | | | Application of paraffin wax | | | |
| Overall diameter (mm) | 1.056 | 1.056 | 1.056 | 1.058 | 1.060 | 1.060 |
| Thickness of coating (mm) | 0.028 | 0.028 | 0.028 | 0.029 | 0.030 | 0.030 |
| Unidirectional abrasion (N) | 26 | 26 | 27 | 30 | 27 | 27 |
| Impact drop test Leakage current (mA) | | | | | | |
| Load 100 g | 0.00 | 0.00 | 0.00 | 0.00 | 0.00 | 0.00 |
| Load 500 g | 0.00 | 0.00 | 0.00 | 0.00 | 0.00 | 0.00 |
| Load 1000 g | 0.11 | 0.08 | 0.03 | 0.00 | 0.05 | 0.03 |

|  | Example 7 | Example 8 | Example 9 | Example 10 | Example 11 | Example 12 |
|---|---|---|---|---|---|---|
| Processed rate before final annealing (%) | 30 | 40 | 40 | 40 | 35 | 35 |
| Annealing temperature (° C.) | 550 | 620 | 620 | 570 | 620 | 620 |
| With or without driving roll | with | with | with | with | with | with |
| Softness of insulated wire (MPa) | 110 | 97 | 98 | 105 | 95 | 97 |
| Enamel 1 (Upper layer) | AI-4 | AI-3 | AI-4 | AI-3 | AI-5 | AI-6 |
| Enamel 2 (Lower layer) | — | HI-406A | HI-406A | Liton 3300 | — | HI-406A |
| Surface treatment of insulated wire | | Baking-type lubricating paint | | | Application of paraffin wax | |
| Overall diameter (mm) | 1.060 | 1.060 | 1.060 | 1.060 | 1.060 | 1.050 |
| Thickness of coating (mm) (Upper layer/lower layer) (μm) | 0.030 | 0.030 (25/5) | 0.030 (25/5) | 0.030 (25/5) | 0.030 | 0.025 (20/5) |
| Unidirectional abrasion (N) | 29 | 30 | 32 | 27 | 30 | 28 |
| Impact drop test Leakage current (mA) | | | | | | |
| Load 100 g | 0.00 | 0.00 | 0.00 | 0.00 | 0.00 | 0.00 |
| Load 500 g | 0.01 | 0.00 | 0.00 | 0.10 | 0.00 | 0.00 |
| Load 1000 g | 0.24 | 0.00 | 0.00 | 0.69 | 0.05 | 0.00 |

|  | Comparative example 1 | Comparative example 2 | Comparative example 3 | Comparative example 4 |
|---|---|---|---|---|
| Processed rate before final annealing (%) | 25 | 40 | 25 | 40 |
| Annealing temperature (° C.) | 500 | 620 | 500 | 620 |
| With or without driving roll | with | with | without | without |
| Softness of insulated wire (MPa) | 120 | 96 | 132 | 125 |
| Enamel 1 (Upper layer) | PyreML | HI-406A | AI-4 | AI-4 |
| Enamel 2 (Lower layer) | — | — | — | HI-406A |
| Surface treatment of insulated wire | | | Baking-type lubricating paint | |
| Overall diameter (mm) | 1.056 | 1.056 | 1.060 | 1.060 |
| Thickness of coating (mm) (Upper layer/lower layer) (μm) | 0.028 | 0.028 | 0.030 | 0.030 (25/5) |
| Unidirectional abrasion (N) | 16 | 19 | 23 | 17 |
| Impact drop test Leakage current (mA) | | | | |
| Load 100 g | 0.06 | 0.02 | 0.01 | 0.04 |
| Load 500 g | 0.97 | 0.54 | 0.40 | 0.83 |
| Load 1000 g | 2.23 | 1.51 | 1.28 | 1.94 |

As is apparent from the results shown in Table 2, it can be understood that each of the insulated wires of the present invention in Examples 1 to 12 had excellent resistance to external scratches. Further, a comparison of the results between Example 7 and Example 4 shows that the more flexible insulated wire can further improve resistance to external scratches.

In Examples 8, 9, and 12, since the insulated wire had a multilayer structure, and a material excellent in adhesiveness was used in the lower layer, the resultant wire exhibited particularly excellent resistance to external scratches.

Further, since the insulated wire in Example 10 had a multilayer structure, and a general-purpose material was used in the lower layer, resistance to external scratches was somewhat inferior to other Examples, but it was still remarkably superior to the conventional ones (Comparative Examples).

On the other hand, in Comparative Examples 1 to 4, since either, or both, of the softness of the insulated wire, as indicated by 0.2% yield stress, and the chemical structures of the resin used in the insulating layer, were out of the range as defined in the present invention, the resultant resistance to external scratches was quite poor.

According to the above results, it is apparent that, if the requirements as defined in the present invention are satisfied with respect to both of the use of the insulated wire having specific softness (in terms of 0.2% yield stress) and the introduction of a specified chemical structure into the resin, to impart high hardness to the insulation coating, resistance to external scratches can be remarkably improved.

INDUSTRIAL APPLICABILITY

The insulated wire of the present invention is preferably suitable as an insulated wire for use in a generator or a motor, particularly in a stator, which wire is accompanied by winding processing, which has been carried out under rigorous conditions in recent years, and in which processing the level of requirements for the wire obtained after such winding working has become high.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An insulated wire, which comprises at least one insulating layer formed by applying and baking, directly or on another insulating layer on a conductor, a resin composition containing at least one compound selected from the group consisting of a polyamidimide resin and a polyimide resin, each having, in the molecular structure of the resin, a structure represented by the following formula (I):

(I)

wherein $R^1$ is selected from the group consisting of a hydrogen atom, an alkyl group, a hydrogen group, a halogen atom, and an alkoxy group; $R^2$ is selected from the group consisting of a hydrogen atom, an alkyl group, a hydroxyl group, a halogen atom, and an alkoxy group, and/or a resin composition containing at least one compound selected from the group consisting of a polyamidimide resin and a polyimide resin, each having, in the molecular structure of the resin, a structure represented by the following formula (II):

(II)

wherein $R^3$ is selected from the group consisting of a hydrogen atom, an alkyl group, a hydroxy group, a halogen atom, and an alkoxy group; $R^4$ is selected from the group consisting of a hydrogen atom, an alkyl group, a hydroxyl group, a halogen atom, and an alkoxy group, and said insulated wire has a 0.2% yield stress of not more than 110 MPa.

2. The insulated wire as claimed in claim 1, wherein said 0.2% yield stress of the insulated wire ranges from 105 MPa to 93 MPa.

3. The insulated wire as claim in claim 1 or 2, wherein part or all of the insulating layers contains a repeating unit derived from a monomer component having the structure represented by the above formula (I), and/or a repeating unit derived from a monomer component having the structure represented by the above formula (II), in an amount of 20 mol % to 60 mol % in all repeating units.

4. The insulated wire as claimed in claim 1 or 2, wherein part or all of the insulating layers contains a repeating unit derived from a monomer component having the structure represented by the above formula (I), and/or a repeating unit derived from a monomer component having the structure represented by the above formula (II), in an amount of 40 mol % to 55 mol % in all repeating units.

5. The insulated wire as claimed in claim 1, wherein the surface of the outermost layer of the insulating layers has lubricity with a coefficient of static friction of not more than 0.1.

6. The insulated wire as claimed in claim 5, wherein the surface of the outermost layer of the insulating layers has a lubricating layer, the lubricating layer being formed by applying and baking a lubricating paint that contains a wax and a thermosetting resin, and that further contains a rosin-series resin and/or a maleic-series resin in an amount of 3 to 20 parts by weight, to 100 parts by weight, of the total solid content of the wax and the thermosetting resin.

7. A stator of a generator or a motor comprising the insulated wire of claim 1.

* * * * *

UNITED STATES PATENT AND TRADEMARK OFFICE
CERTIFICATE OF CORRECTION

PATENT NO. : 6,436,537 B1
DATED : August 20, 2002
INVENTOR(S) : Masakazu Mesaki, Yoshinori Tatematsu and Masaki Sugiura It is certified that error appears in the above-identified patent and that said Letters Patent is hereby corrected as shown below:

<u>Title page</u>,
Item [56], FOREIGN PATENT DOCUMENTS, please reverse the headings as follows: "JP A55104461" reference, and before "4,378,407 A" reference, change the references as follows:
"A5010589" to -- A50108589 --; and
"A6200605" to -- A62200605 --

Signed and Sealed this

Eleventh Day of November, 2003

JAMES E. ROGAN
*Director of the United States Patent and Trademark Office*